(12) United States Patent
Thomas et al.

(10) Patent No.: US 6,675,677 B2
(45) Date of Patent: Jan. 13, 2004

(54) TRANSFER CASE WITH MULTI-GEAR TRANSFER MECHANISM

(75) Inventors: Gareth Thomas, Banbury Oxfordshire (GB); Paul Cowsill, Redditch (GB); Thomas C. Bowen, Rochester Hill, MI (US); Dale L. Pennycuff, Shelby Township, MI (US); Malcolm E. Kirkwood, Livonia, MI (US); John D. Zalewski, Liverpool, NY (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 10/122,288

(22) Filed: Apr. 12, 2002

(65) Prior Publication Data

US 2003/0192401 A1 Oct. 16, 2003

(51) Int. Cl.$^7$ ................................................ F16H 37/06
(52) U.S. Cl. ................................. 74/665 GA; 180/247
(58) Field of Search ..................... 74/665 GA; 180/247

(56) References Cited

U.S. PATENT DOCUMENTS

| | | | |
|---|---|---|---|
| 4,559,846 A | * 12/1985 | Cochran et al. | ....... 74/665 GA |
| 4,586,583 A |   5/1986 | Yamakawa et al. | ......... 180/247 |
| 4,762,021 A | *  8/1988 | Teraoka | ................. 74/665 GA |
| 4,782,721 A | * 11/1988 | Dick | ..................... 74/665 GA |
| 5,054,335 A | * 10/1991 | Andrews | ............... 74/665 GA |
| 5,423,235 A | *  6/1995 | Botterill et al. | ........ 74/665 GA |

\* cited by examiner

*Primary Examiner*—Ha Ho
(74) *Attorney, Agent, or Firm*—Harness, Dickey & Pierce, P.L.C.

(57) ABSTRACT

A transfer case is provided and includes a first output shaft driven by a powertrain and operably interconnected with a first pair of wheels, a second output shaft selectively driven by the first output shaft and operably interconnected with a second pair of wheels and a transfer gear assembly operably disposed between the first output shaft and the second output shaft for transferring drive torque from the first output shaft to the second output shaft. The transfer gear assembly includes a first transfer gear in selective drive connection with the first output shaft, a second transfer gear in meshed engagement with the first transfer gear, a third transfer gear in drive connection with the second transfer gear and the second output shaft. A clutch pack is operably disposed between the first output shaft and the first transfer gear for selectively establishing drive connection therebetween.

24 Claims, 5 Drawing Sheets

TRANSFER CASE WITH MULTI-GEAR TRANSFER MECHANISM

FIELD OF THE INVENTION

The present invention relates to transfer cases and more particularly to a transfer case having a multi-gear transfer mechanism.

BACKGROUND OF THE INVENTION

Traditionally, four-wheel drive (4WD) and all-wheel drive (AWD) vehicles enable transfer of drive torque, produced by an engine and supplied through a gear reducing transmission, to front and rear wheel assemblies. Depending upon the particular vehicle configuration, drive torque can be transferred to both the front and rear wheel assemblies on a full-time basis, part-time basis or "on-demand" basis. A vehicle using an "on-demand" system, normally operates in two-wheel drive (2WD) driving one of the front and rear wheel assemblies and selectively transfers drive torque to the other of the front and rear wheel assemblies in response to vehicle driving conditions.

A transfer case is generally provided for enabling the split of drive torque between the front and rear wheel assemblies. The transfer case includes an input, operably interconnected to an output of the transmission, a first output shaft and a second output shaft, respectively interconnected with the wheel assemblies. A transfer mechanism is provided therein for selectively engaging the first and second output shafts, enabling the transfer of drive torque therebetween. The transfer case must be conveniently packaged within a vehicle underbody, avoiding interference with other vehicle components including drive shafts, exhaust, suspension, vehicle frame and the like. Packaging of the transfer case within a vehicle underbody has become more difficult in recent years, as automakers seek to implement 4WD/AWD systems in smaller vehicle applications.

Traditional transfer mechanisms include first and second transfer gears interconnected by a transfer chain. The transfer gears are respectively interconnected with the first and second output shafts for rotation therewith. As the first output shaft is caused to rotate, thereby rotating the first transfer gear, the transfer chain transfers drive torque to the second output shaft through the second transfer gear.

Transfer mechanism employing transfer chains retain significant disadvantages. A first disadvantage is the limited configurability. As mentioned above, a recent trend is to provide 4WD/AWD systems in increasingly smaller vehicle applications. Thus, underbody packaging plays an important role. Traditional transfer cases are sometimes difficult to properly package due to the limited configurability of the chain-type transfer mechanisms. A second disadvantage if noise, vibration and harshness (NVH) associated with chain-type transfer mechanisms.

In view of the above, it is desirable in the industry to provide an improved transfer case design. In particular, the improved transfer case design should alleviate the problems associated with traditional transfer cases employing chain-type transfer mechanism and should further enable design flexibility for resolving underbody packaging issues.

SUMMARY OF THE INVENTION

Accordingly, one embodiment of the present invention provides a transfer case for use in a motor vehicle to selectively transfer drive torque from a powertrain to first and second pairs of wheels. The transfer case includes a first output shaft driven by the powertrain and operably interconnected with the first pair of wheels for driving the first pair of wheels, a second output shaft selectively driven by the first output shaft and operably interconnected with the second pair of wheels for driving the second pair of wheels, and a transfer gear assembly operably disposed between the first output shaft and the second output shaft for transferring drive torque from the first output shaft to the second output shaft. The transfer gear assembly includes a first transfer gear in selective drive connection with the first output shaft, the first transfer gear having a first rotational axis, a second transfer gear in drive connection with the first transfer gear, the second transfer gear having a second rotational axis and a third transfer gear in drive connection with the second transfer gear and the second output shaft, the third transfer gear having a third rotational axis.

In accordance with another embodiment of the present invention, the transfer case further includes a fourth transfer gear having a fourth rotational axis and intermeshed with the first transfer gear and the second transfer gear and a fifth transfer gear having a fifth rotational axis and intermeshed with the second transfer gear and the third transfer gear. Preferably, any two of the first, second, third, fourth, and fifth rotational axis define a plane from which the other of the first, second, third, fourth, and fifth rotational axis are offset.

In either the first or second preferred embodiments, a clutch pack is preferably disposed between the first output shaft and the first transfer gear for selectively establishing drive connection therebetween. In this manner, "on-demand" AWD is provided for.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
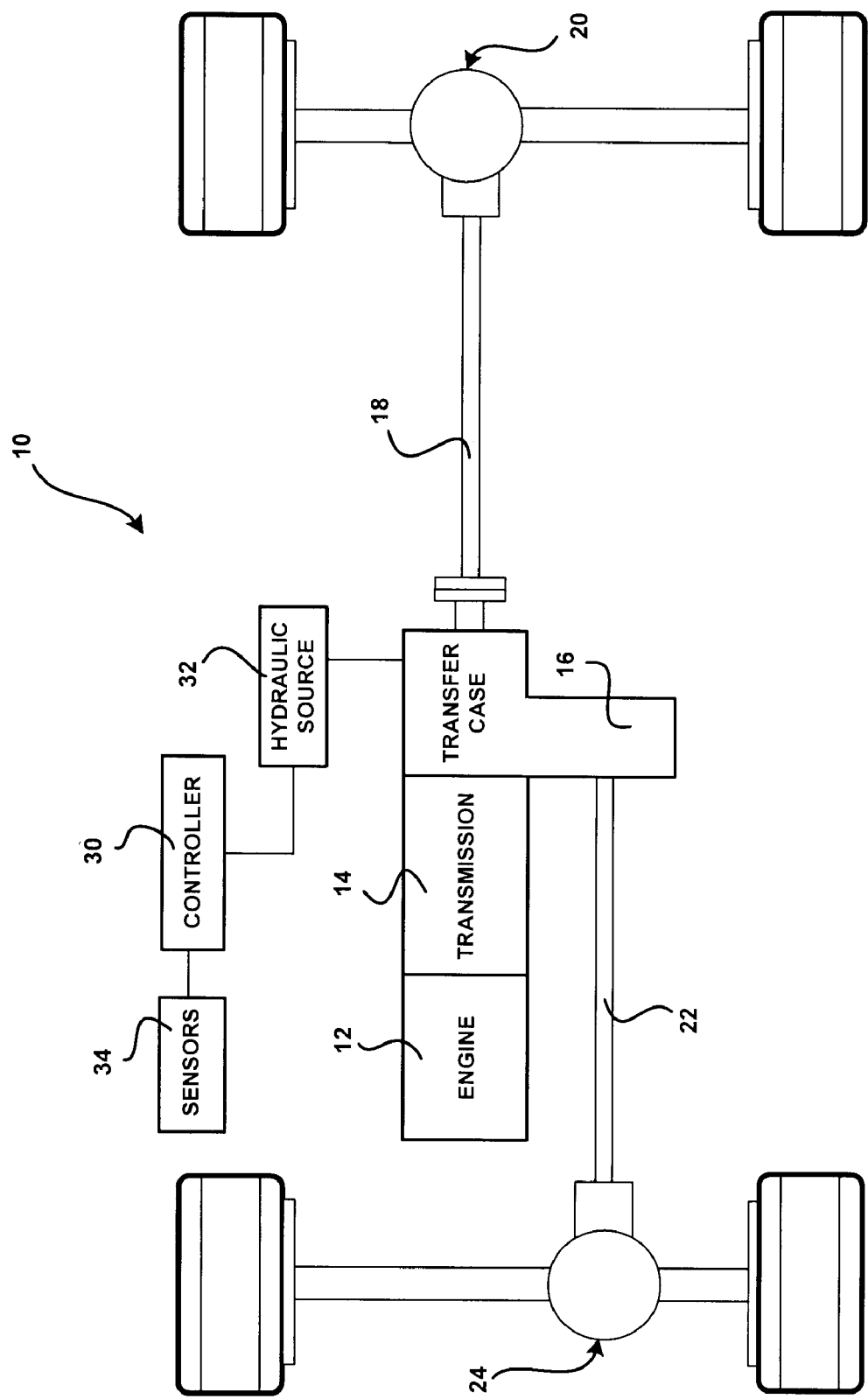
FIG. 1 is a schematic view of a vehicle driveline implementing a transfer case in accordance with the principles of the present invention.

With reference to FIG. 1, an exemplary vehicle driveline 10 is shown including an engine 12, a transmission 14, a transfer case 16, a rear drive shaft 18, a rear wheel assembly 20, a front drive shaft 22 and a front wheel assembly 24. The engine 12 is operably interconnected with the transmission 14, which is operably interconnected to the transfer case 16. The engine 12 produces drive torque that is transferred to the transfer case 16 through selective gear ratios of the transmission 14. The transmission 14 is one of an automatic or manual type, as is known in the art. The transfer case 16 selectively splits the drive torque from the engine 12 for driving the front and rear wheel assemblies 24, 22.

A controller 30 is provided and is in communication with a hydraulic source 32 and a sensor group 34. The sensor group 34 detects current driving conditions and relays that information to the controller 30. The controller 30 determines what action is required, in response to the driving conditions, and selectively engages the hydraulic source 32 for appropriate manipulation of the transfer case 16. Control of the transfer case 16 is described in further detail hereinbelow.

Figure 2:
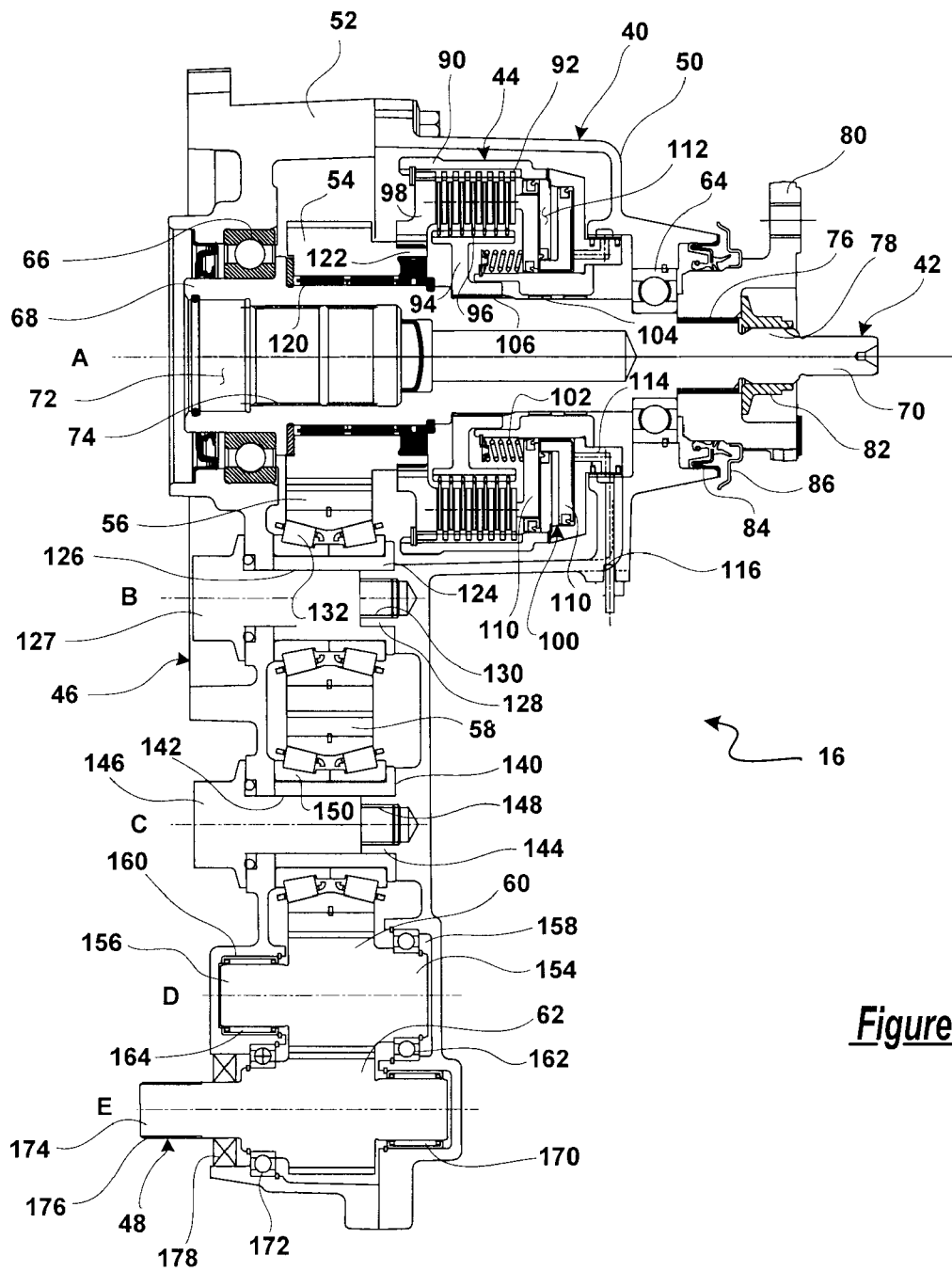
FIG. 2 is a cross-sectional view of a first preferred embodiment of the transfer case of FIG. 1.

With particular reference to FIG. 2, the transfer case 16 includes a housing 40, a first output shaft 42, a clutch pack 44, a transfer gear assembly 46 and a second output shaft 48. The housing 40 includes first and second housing halves 50, 52 and supports the various components therein, whereby the first output shaft 42 selectively drives the transfer gear assembly 46 for driving the second output shaft 48. The clutch pack 44 is operably disposed between the first output shaft 42 and the transfer gear assembly 46 for selectively establishing drive communication therebetween. In accordance with a first preferred embodiment, the transfer gear assembly 46 includes first, second, third, fourth and fifth transfer gears 54, 56, 58, 60, 62, respectively. In accordance with a second preferred embodiment, the transfer gear assembly 46 only includes the first, third and fifth transfer gears 54, 58, 62. Each of the first and second preferred embodiments will be described in further detail hereinbelow.

The first output shaft 42 is rotatably supported within the housing 40 by bearings 64, 66 and includes an input end 68 and an output end 70. The input end 68 includes a bore 72, within which splines 74 are formed. The bore 72 and splines 74 enable interconnection between the first output shaft 42 and an output of the transmission 14 (not shown). The output end 70 includes a splined portion 76 and a threaded portion 78. A flange 80 is received onto the splined portion 76 for driving engagement with the first output shaft 42 and a nut 82 is threaded onto the threaded portion 78 for retaining the flange 80 on the first output shaft 42. The flange 80 is attachable to the rear drive shaft 18 for enabling transfer of drive torque therethrough. A seal 84 and slinger (dust shield) 86 are provided about the flange 80, protecting the bearing 66 from dirt and debris.

The clutch pack 44 includes an outer case 90 having a series of inwardly extending clutch plates 92 attached thereto, an inner case 94 having a series of outwardly extending clutch plates 96 attached thereto, a transfer plate 98, an actuation piston 100 and a plurality of springs 102 biasing the actuation piston 100. The outer case 90 is rotatably and slidably supported about the first output shaft 42 on bearings 104. The transfer plate 98 interconnects the outer case 90 and the transfer gear assembly 46, as described in further detail herein. The inner case 94 is fixed for rotation with the first output shaft 42 via a spline interface 106. The clutch plates 92 of the outer case 90 mesh with the clutch plates 96 of the inner case 94. In a first mode, the clutch plates 96, 92 of the inner and outer cases 94, 90 slip relative to one another, thereby enabling the outer case 90 to rotate independently of the inner case 94. In a second mode, the clutch plates 96, 92 of the inner and outer cases 94, 90 are engaged, thereby fixing the outer case 90 for rotation with the inner case 94 and thus for rotation with the first output shaft 42.

The actuation piston 100 selectively enables operation of the clutch pack 44 in either the first or second modes and degrees of operation therebetween. The actuation piston 100 includes a series of actuation plates 110 slidably disposed within a cavity 112 of outer case 90. A series of hydraulic fluid ports 114 are formed through the outer case 90, enabling fluid communication between the source of hydraulic fluid 32 and the actuation piston 100. The source of hydraulic fluid 32 is in fluid communication with the clutch pack 44 through a port 116 formed in the housing 40. The plurality of springs 102 bias the actuation piston 100 to a first position, whereby the clutch plates 96, 92 of the inner and outer cases 94, 90 are disengaged, enabling the clutch pack 44 to operate in the first mode. Application of hydraulic fluid through the fluid ports 114 pushes the actuation piston 100 against the force of the bias springs 102 and against the clutch plates 96, 92 for engaging the clutch plates 96, 92, enabling the clutch pack 44 to operate in the second mode.

In accordance with the first preferred embodiment of the transfer gear assembly 46, the first, second, third, fourth and fifth transfer gears 54, 56, 58, 60, 62 respectively, are included. The first transfer gear 54 is rotatably supported about the first output shaft 42 on roller bearings 120, whereby the first transfer gear 54 and the first output shaft 42 share a common rotational axis, hereinafter the first rotational axis A. Thus, the first transfer gear 54 rotates independently of the first output shaft 42. The first transfer gear 54 includes a series of circumferentially formed, radially extending gear teeth, preferably helical in form, and a collar 122 in splined engagement with the transfer plate 98 of the clutch pack 44. In this manner, the first transfer gear 54 is fixed for rotation with the outer case 90.

The second transfer gear 56 is in meshed engagement with the first transfer gear 54 and is rotatably supported within the housing 40 on a bushing 124. The bushing 124 is generally cylindrical in shape, having a bore 126 therethrough, whereby a collar 128 of the housing 40 is received into the bore 126 for supporting the bushing 124 within the housing 40. A retention bolt 127 is disposed through the bore 126 of the bushing 124, engaging a threaded bore 130 of the collar 128, thereby retaining the bushing 124 in position and assembling the first and second housing halves 50, 52. The second transfer gear 54 is rotatably supported on the bushing 124 by tapered bearings 132, disposed therebetween and rotates about a second rotational axis B. Further, the second transfer gear 56 includes a series of circumferentially formed, radially extending teeth, preferably helical in form.

The third transfer gear 58 is in meshed engagement with the second transfer gear 56 and is rotatably supported within the housing 40 on a bushing 140. The bushing 140 is generally cylindrical in shape, having a bore 142 therethrough, whereby a collar 144 of the housing 40 is received into the bore 142 for supporting the bushing 140 within the housing 40. A retention bolt 146 is disposed through the bore 142 of the bushing 140, engaging a threaded bore 148 of the collar 144, thereby retaining the bushing 140 in position and assembling the first and second housing halves 50, 52. The third transfer gear 58 is rotatably supported on the bushing 140 by tapered bearings 150, disposed therebetween and rotates about a third rotational axis C. Further, the third transfer gear 58 includes a series of circumferentially formed radially extending teeth, preferably helical in form.

The fourth transfer gear 60 is in meshed engagement with the third transfer gear 58 and is rotatably supported in the housing 40. More specifically, the fourth transfer gear 60 includes axially extending stub ends 154, 156, each rotatably supported within corresponding recesses 158, 160 of the housing 40, by bearings 162, 164, respectively. The fourth transfer gear 60 rotates about a fourth rotational axis D and includes a series of circumferentially formed, radially extending teeth, preferably helical in form.

The fifth transfer gear 62 is in meshed engagement with the fourth transfer gear 58 and is fixed for rotation with the second output shaft 48. Although the fifth transfer gear 62 may be a separate component, it is anticipated that the fifth transfer gear 62 is integrally formed about the second output shaft 48. The second output shaft 48 is rotatably supported within the housing 40 by bearings 170, 172. An output end 174 extends from the housing 40 and includes splines 176 for engaging the front drive shaft 22. A seal 178 is provided about the output end 174, protecting the bearing 170 and interior of the housing 40 from dirt and debris. The fifth transfer gear 62 rotates about a fifth rotational axis E and includes a series of circumferentially formed, radially extending teeth, preferably helical in form.

Figure 3:
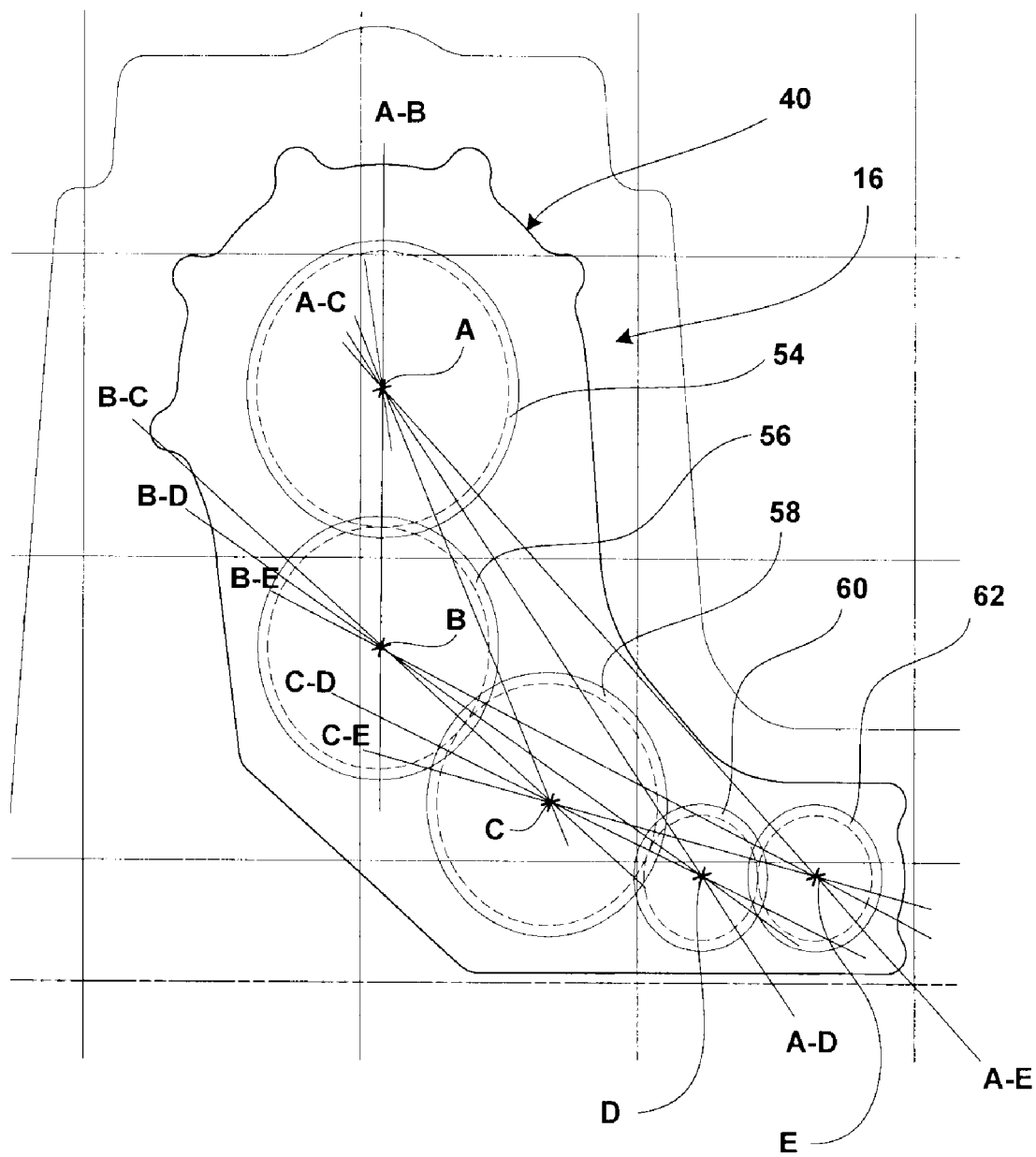
FIG. 3 is a schematic side view of the transfer case of FIG. 2.

With reference to FIG. 3, relative alignment of the first, second, third, fourth and fifth rotational axis A, B, C, D, E, will be described in detail. As shown, any two of the rotational axis may form a plane, from which the remaining rotational axis are offset. In this manner, an 'L' shaped cross-section is provided, enabling the transfer case 16 to be packaged around other underbody components of the vehicle. Variation in the relative positions of the axis enables a variation in the cross-section to provide alternative packaging options. Although the present embodiment only provides a plane being defined between two rotational axis, it will be appreciated that the rotational axis may be so aligned, whereby two or more rotational axis define a plane, from which the others are offset. The variation in transfer case configuration enables underbody packaging advantages over prior art transfer cases.

Figure 4:
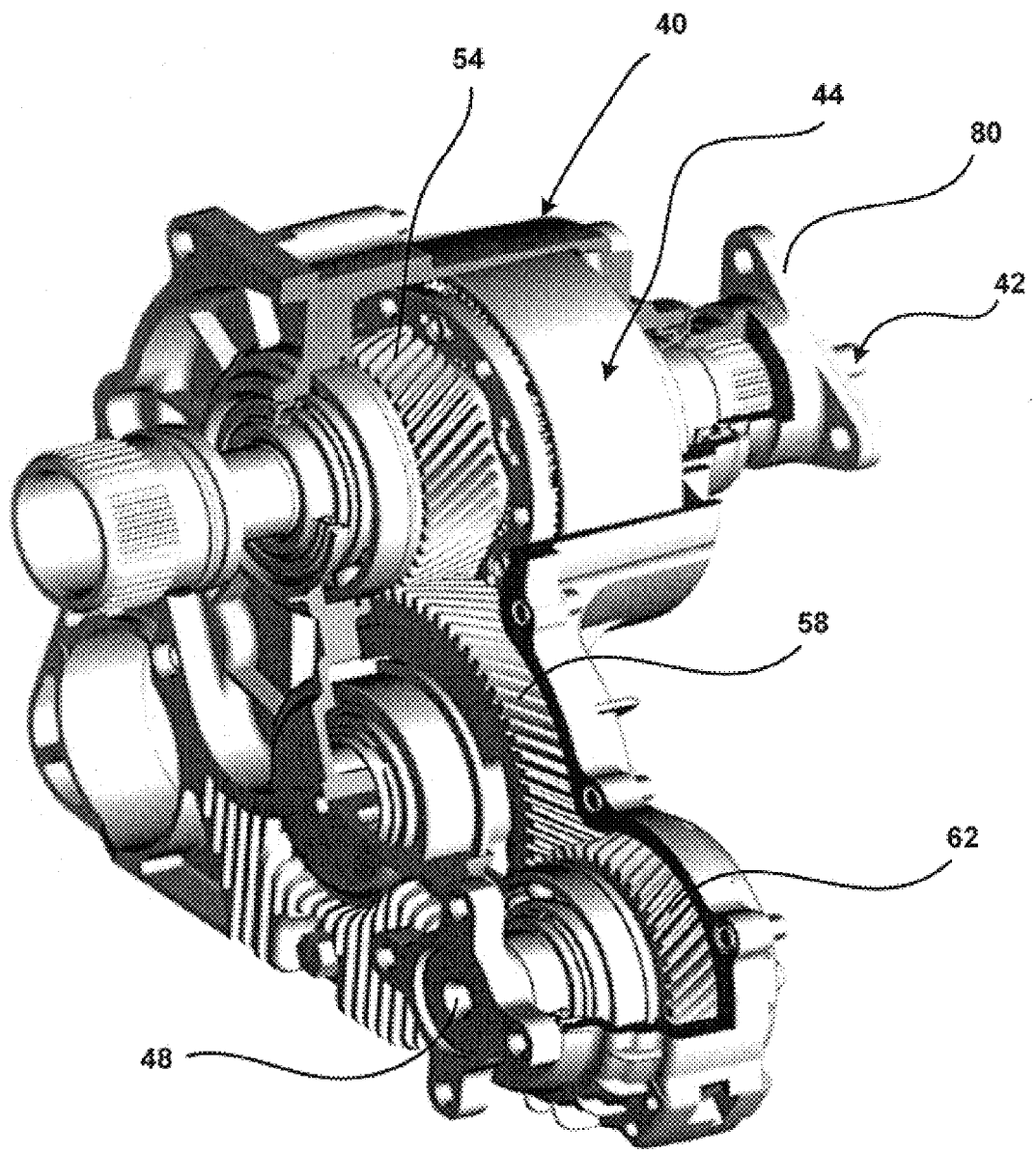
FIG. 4 is a perspective, partial sectional view of a second preferred embodiment of the transfer case of FIG. 1.

With reference to FIG. 4, the second preferred embodiment of the transfer gear assembly 46 includes the first, third, and fifth transfer gears 54, 58, 62. The first transfer gear 54 is rotatably supported about the first output shaft 42 and interconnected with the clutch pack 44 as described above. In accordance with the second preferred embodiment, the first transfer gear 54 is in meshed engagement with the third transfer gear 58, which is in meshed engagement with the fifth transfer gear 62. In this manner, the total number of transfer gears is reduced, thereby reducing the overall size and thus, packaging requirements of the transfer case 16.

Figure 5:
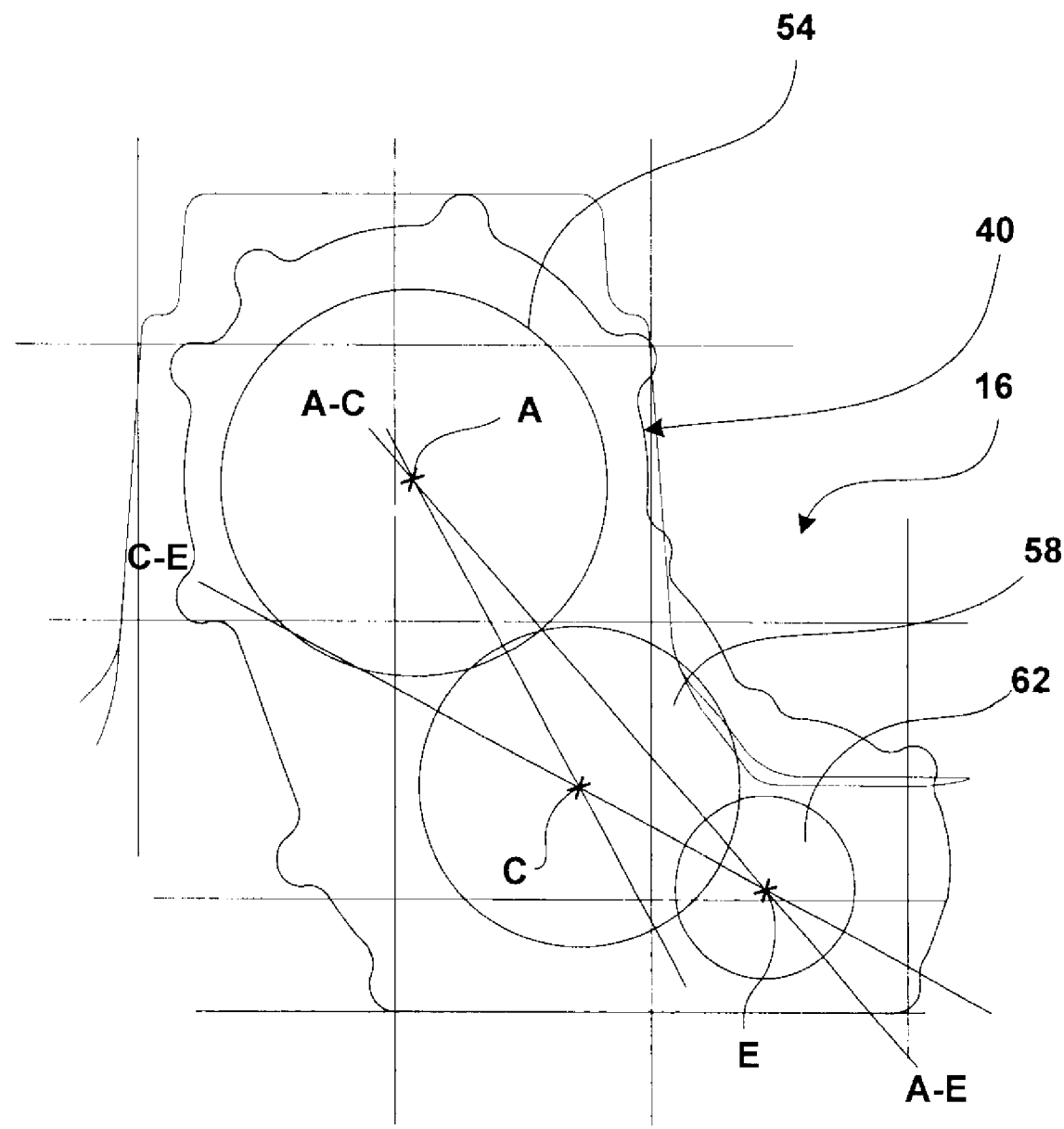
FIG. 5 is a schematic side view of the transfer case of FIG. 4.

With reference to FIG. 5, relative alignment of the first, third and fifth rotational axis A, C, E will be described in detail. As shown, any two of the rotational axis may form a plane, from which the remaining rotational axis is offset. In this manner, a generally 'L' shaped cross-section is provided, enabling the transfer case 16 to be packaged around other underbody components of the vehicle. Variation in the relative positions of the axis enables a variation in the cross-section to provide alternative packaging options. Although the present embodiment only provides a plane being defined between two rotational axis, it will be appreciated that the rotational axis may be so aligned, whereby two or more rotational axis define a plane. The reduced number of rotational axis of the second preferred embodiment, as compared to the first preferred embodiment, limits the configurability thereof, however, reduction in the overall size of the transfer case 16 alleviates any disadvantages such limited configurability may present.

The vehicle driveline 10 is preferably operated in an 'on-demand' AWD mode, whereby the driveline normally operates in 2WD, providing drive torque to either the rear or front wheel assembly 20, 24 only, and selectively switches to AWD, providing drive torque to both the rear and front wheel assemblies 20, 24, in response to driving conditions. As mentioned above, the sensor group 34 sense various driving conditions, in particular wheel slippage, relaying that information to the controller 30. Accordingly, the controller 30 controls operation of the clutch pack 44 through application of hydraulic fluid to selectively engage the clutch pack 44. Engagement of the clutch pack 44 fixes the first transfer gear 56 for rotation with the first output shaft 42, thereby providing drive torque to the second output shaft 48 through the transfer gear assembly 46. The gears of the transfer gear assembly 46 provide smooth torque transfer therethrough, alleviating problems such as noise, vibration, harshness and the like, associated with prior art transfer cases.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A transfer case for use in a motor vehicle to selectively transfer drive torque from a powertrain to first and second pairs of wheels, comprising:

a first output shaft driven by the powertrain and operably interconnected with the first pair of wheels for driving the first pair of wheels;

a second output shaft selectively driven by said first output shaft and operably interconnected with the second pair of wheels for driving the second pair of wheels;

a transfer gear assembly operably disposed between said first output shaft and said second output shaft for transferring drive torque from said first output shaft to said second output shaft, said transfer gear assembly including a first transfer gear in selective drive connection with said first output shaft, said first transfer gear having a first rotational axis, a second transfer gear in meshed engagement with said first transfer gear, said second transfer gear having a second rotational axis, and a third transfer gear in drive connection with said second transfer gear and said second output shaft, said third transfer gear having a third rotational axis; and a clutch pack operably disposed between said first output shaft and said first transfer gear for selectively establishing drive connection therebetween, said clutch pack including an outer casing fixed for rotation with said first transfer gear, an inner casing fixed for rotation with said first output shaft, and a first series of clutch plates fixed to said outer casing and a second series of clutch plates intermeshed with said first series of clutch plates and fixed to said inner casing, said first and second series of clutch plates selectively actuated for establishing a drive connection between said inner casing and said outer casing.

2. A transfer case for use in a motor vehicle to selectively transfer drive torque from a powertrain to first and second pairs of wheels, comprising:

a first output shaft driven by the powertrain and operably interconnected with the first pair of wheels for driving the first pair of wheels;

a second output shaft selectively driven by said first output shaft and operably interconnected with the second pair of wheels for driving the second pair of wheels;

a transfer gear assembly operably disposed between said first output shaft and said second output shaft for transferring drive torque from said first output shaft to said second output shaft, said transfer gear assembly including a first transfer gear in selective drive connection with said first output shaft, said first transfer gear having a first rotational axis, a second transfer gear in meshed engagement with said first transfer gear, said second transfer gear having a second rotational axis, and a third transfer gear in drive connection with said second transfer gear and said second output shaft, said third transfer gear having a third rotational axis; and a clutch Pack operably disposed between said first output shaft and said first transfer gear for selectively establishing drive connection therebetween; and a hydraulic port establishing fluid communication between a source of pressurized hydraulic fluid and said clutch pack, whereby said pressurized hydraulic fluid is selectively applied to said clutch pack for establishing a drive connection between said first output shaft and said first transfer gear.

3. A transfer case for use in a motor vehicle to selectively transfer drive torque from a powertrain to first and second pairs of wheels, comprising:

a first output shaft driven by the powertrain and operably interconnected with the first pair of wheels for driving the first pair of wheels;

a second output shaft selectively driven by said first output shaft and operably interconnected with the second pair of wheels for driving the second pair of wheels;

a transfer gear assembly operably disposed between said first output shaft and said second output shaft for transferring drive torque from said first output shaft to said second output shaft, said transfer gear assembly including a first transfer gear in selective drive connection with said first output shaft, said first transfer gear having a first rotational axis, a second transfer gear in meshed engagement with said first transfer gear, said second transfer gear having a second rotational axis; and a third transfer gear in drive connection with said second transfer gear and said second output shaft, said third transfer gear having a third rotational axis;

a clutch pack operably disposed between said first output shaft and said first transfer gear for selectively establishing drive connection therebetween, and a controller for engaging said clutch pack in response to slippage of the first pair of wheels.

4. The transfer case of claim 3, wherein any two of said first, second and third rotational axis define a plane from which the other of said first, second and third rotational axis is offset.

5. The transfer case of claim 3, wherein said first transfer gear is rotatably disposed about said first output shaft, whereby said first transfer gear and said first output shaft share said first axis of rotation.

6. The transfer case of claim 3, wherein said third transfer gear is integrally formed with said second output shaft.

7. The transfer case of claim 3, further comprising:

a fourth transfer gear having a fourth rotational axis and intermeshed with said first transfer gear and said second transfer gear; and a fifth transfer gear having a fifth rotational axis and intermeshed with said second transfer gear and said third transfer gear.

8. The transfer case of claim 7, wherein any two of said first, second, third, fourth, and fifth rotational axis define a plane from which the other of said first, second, third, fourth, and fifth rotational axis are offset.

9. A vehicle having a powertrain operably interconnected to first and second pairs of wheels, comprising:

a transfer case operably disposed between the powertrain and the first and second pairs of wheels for transferring drive torque to one of the first and second pairs of wheels and selectively to the other of the first and second pairs of wheels, said transfer case including:

a first output shaft driven by the powertrain and operably interconnected with the first pair of wheels for driving thereof;

a second output shaft selectively driven by said first output shaft and operably interconnected with the second pair of wheels for driving thereof;

a transfer gear assembly operably disposed between said first output shaft and said second output shaft for transferring drive torque from said first output shaft to said second output shaft, said transfer gear including a first transfer gear in selective drive connection with said first output shaft, said first transfer gear having a first rotational axis, a second transfer gear in meshed engagement with said first transfer gear, said second transfer gear having a second rotational axis, and a third transfer gear in drive connection with said second transfer gear and said second output shaft, said third transfer gear having a third rotational axis, and a clutch pack operably disposed between said first output shaft and said first transfer gear, said clutch pack comprises an outer casing fixed for rotation with said first transfer gear, an inner casing fixed for rotation with said first output shaft, a first series of clutch plates fixed to said outer casing and a second series of clutch plates intermeshed with said first series of clutch plates and fixed to said inner casing, said first and second series of clutch plates selectively actuated for establishing a drive connection between said inner casing and said outer casing.

10. A vehicle having a powertrain operably interconnected to first and second pairs of wheels, comprising:

a transfer case operably disposed between the powertrain and the first and second pairs of wheels for transferring drive torque to one of the first and second pairs of wheels and selectively to the other of the first and second pairs of wheels, said transfer case including:

a first output shaft driven by the powertrain and operably interconnected with the first pair of wheels for driving thereof;

a second output shaft selectively driven by said first output shaft and operably interconnected with the second pair of wheels for driving thereof;

a transfer gear assembly operably disposed between said first output shaft and said second output shaft for transferring drive torque from said first output shaft to said second output shaft, said transfer gear including a first transfer gear in selective drive connection with said first output shaft, said first transfer gear having a first rotational axis, a second transfer gear in meshed engagement with said first transfer gear, said second transfer gear having a second rotational axis, and a third transfer gear in drive connection with said second transfer gear and said second output shaft, said third transfer gear having a third rotational axis;

a clutch pack operably disposed between said first output shaft and said first transfer gear; and a hydraulic port establishing fluid communication between a source of pressurized hydraulic fluid and said clutch pack, whereby said pressurized hydraulic fluid is selectively applied to said clutch pack for establishing a drive connection between said first output shaft and said first transfer gear.

11. A vehicle having a powertrain operably interconnected to first and second pairs of wheels, comprising:

a transfer case operably disposed between the powertrain and the first and second pairs of wheels for transferring drive torque to one of the first and second pairs of wheels and selectively to the other of the first and second pairs of wheels, said transfer case including:

a first output shaft driven by the powertrain and operably interconnected with the first pair of wheels for driving thereof;

a second output shaft selectively driven by said first output shaft and operably interconnected with the second pair of wheels for driving thereof;

a transfer gear assembly operably disposed between said first output shaft and said second output shaft for transferring drive torque from said first output shaft to said second output shaft, said transfer gear assembly including a first transfer gear in selective drive connection with said first output shaft, said first transfer gear having a first rotational axis, a second transfer gear in meshed engagement with said first transfer gear, said second transfer gear having a second rotational axis, and a third transfer gear in drive connection with said second transfer gear and said second output shaft, said third transfer gear having a third rotational axis;

a clutch pack operably disposed between said first output shaft and said first transfer gear; and a controller for engaging said clutch pack in response to slippage of the first pair of wheels.

12. The vehicle of claim 11, wherein any two of said first, second and third rotational axis define a plane from which the other of said first, second and third rotational axis is offset.

13. The vehicle of claim 11, wherein said first transfer gear is rotatably disposed about said first output shaft, whereby said first transfer gear and said first output shaft share said first axis of rotation.

14. The vehicle of claim 11, wherein said third transfer gear is integrally formed with said second output shaft.

15. The vehicle of claim 11, further comprising:

a fourth transfer gear having a fourth rotational axis and intermeshed with said first transfer gear and said second transfer gear; and a fifth transfer gear having a fifth rotational axis and intermeshed with said second transfer gear and said third transfer gear.

16. The vehicle of claim 15, wherein any two of said first, second, third, fourth, and fifth rotational axis define a plane from which the other of said first, second, third, fourth, and fifth rotational axis are offset.

17. A transfer case for use in a motor vehicle to selectively transfer drive torque from a powertrain to first and second pairs of wheels, comprising:

a first output shaft driven by the powertrain and operably interconnected with the first pair of wheels for driving the first pair of wheels;

a second output shaft selectively driven by said first output shaft and operably interconnected with the second pair of wheels for driving the second pair of wheels; and a transfer gear assembly operably disposed between said first output shaft and said second output shaft for transferring drive torque from said first output shaft to said second output shaft, said transfer gear assembly comprising:

a first transfer gear in selective drive connection with said first output shaft, said first transfer gear having a first rotational axis;

a second transfer gear in meshed engagement with said first transfer gear, said second transfer gear having a second rotational axis;

a third transfer gear in meshed engagement with said second transfer gear, said third transfer gear having a third rotational axis;

a fourth transfer gear having a fourth rotational axis and in meshed engagement with said third transfer gear; and a fifth transfer gear having a fifth rotational axis and in meshed engagement with said fourth transfer gear and fixed for rotation with said second output shaft.

18. The transfer case of claim 17, further comprising a clutch pack operably disposed between said first output shaft and said first transfer gear for selectively establishing drive connection therebetween.

19. The transfer case of claim 18, wherein said clutch pack comprises:

an outer casing fixed for rotation with said first transfer gear;

an inner casing fixed for rotation with said first output shaft; and a first series of clutch plates fixed to said outer casing and a second series of clutch plates intermeshed with said first series of clutch plates and fixed to said inner casing, said first and second series of clutch plates selectively actuated for establishing a drive connection between said inner casing and said outer casing.

20. The transfer case of claim 18, further comprising a hydraulic port establishing fluid communication between a source of pressurized hydraulic fluid and said clutch pack, whereby said pressurized hydraulic fluid is selectively applied to said clutch pack for establishing a drive connection between said first output shaft and said first transfer gear.

21. The transfer case of claim 18, further comprising a controller for engaging said clutch pack in response to slippage of the first pair of wheels.

22. The transfer case of claim 17, wherein said first transfer gear is rotatably disposed about said first output shaft, whereby said first transfer gear and said first output shaft share said first axis of rotation.

23. The transfer case of claim 17, wherein said fifth transfer gear is integrally formed with said second output shaft.

24. The transfer case of claim 17, wherein any two of said first, second, third, fourth, and fifth rotational axis define a plane from which the other of said first, second, third, fourth, and fifth rotational axis are offset.

* * * * *